Jan. 22, 1963
B. A. SHOOR
3,075,099
ACCELEROMETER
Filed June 3, 1959
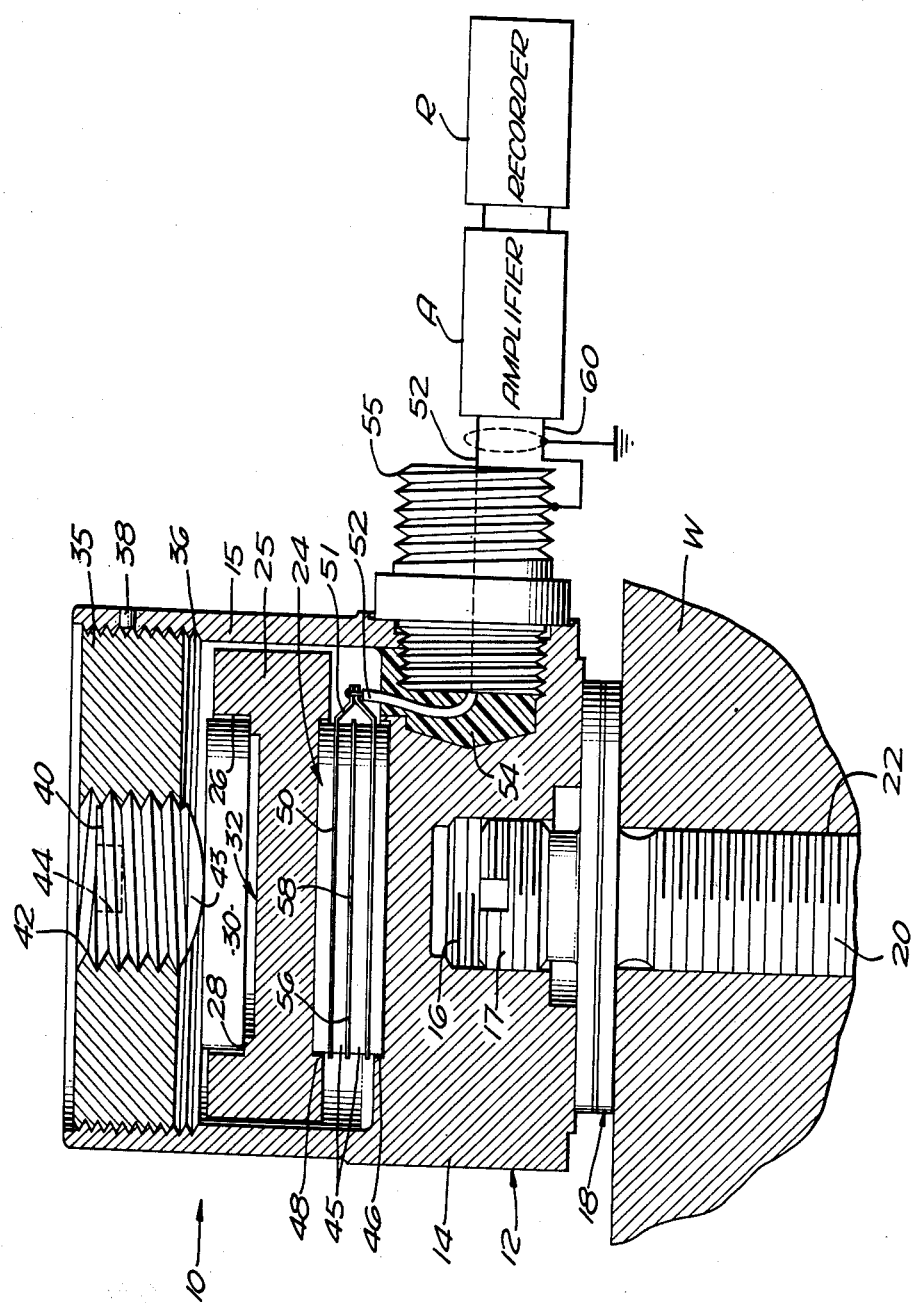
BERNARD A. SHOOR
INVENTOR.
BY
*Reed*
ATTORNEY

United States Patent Office 3,075,099
Patented Jan. 22, 1963

3,075,099
ACCELEROMETER
Bernard A. Shoor, Pasadena, Calif., assignor to Endevco Corporation, Pasadena, Calif., a corporation of California
Filed June 3, 1959, Ser. No. 817,847
6 Claims. (Cl. 310—8.4)

This invention relates to accelerometers which generate electrical impulses in accordance with acceleration to be detected.

In accelerometers of the type to which this invention applies, piezoelectric sensing elements or units are commonly employed for generating the electrical signals. Such accelerometers are employed in the testing and design of various machines and apparatus and are required to be mounted securely upon such machines while being subjected to vibration being measured. Such a device includes a case or suitable housing in which the piezoelectric unit is placed under compression by means of a resilient member, such as a spring. In the present invention, the improvement relates particularly to the spring or other resilient means employed in compressing of the piezoelectric unit or element and to the means for applying pressure to the spring.

In practice, accelerometers of this type are made as small as conveniently possible, in order to maintain weight as low as possible and in order to render it possible to install such accelerometers in very small spaces. For these and other reasons, accelerometers of this type are often made with a total height and diameter of less than one inch. The loading springs for such structures are therefore exceedingly small and commonly have diameters of less than half an inch. However, such springs must be rather heavily preloaded.

Such an accelerometer is designed to respond to components of acceleration along a predetermined "acceleration axis" that is generally parallel to the axis of the housing and perpendicular to the base. In order to avoid spurious indications, it is very important to reduce cross-axis sensitivity of such accelerometers to a low value. For example, various military and commercial specifications require that such cross-axis sensitivity be less than five (5%) percent of the sensitivity of the accelerometer along its main sensitive axis.

It has been found that such cross-axis sensitivity can be introduced by the application of shearing forces to the piezoelectric elements in directions that are transverse to the main axis of the accelerometer.

An important object of this invention, therefore, is to provide a spring arrangement for accelerometers and means for applying forces through such spring in such a way as to reduce or entirely avoid the introduction of shearing forces which would cause such cross-axis sensitivity.

According to this invention, a substantially flat spring is mounted in a counterbored recess of the inertial member and with its peripheral portion in contact with a transverse annular shoulder in said recess, and pressure is applied to the spring through a centered point of a threaded stud that extends through the center of the accelerometer case opposite the spring.

Various features of the invention and other objects thereof will become apparent to those skilled in this art upon reference to the following specification and the accompanying drawing, wherein there is illustrated an embodiment presently deemed to represent the best mode of practicing the invention.

In the drawing:

The single FIGURE is a vertical cross-section, on a very much enlarged scale, of a cylindrical accelerometer produced in accordance with this invention.

The accelerometer is generally indicated at 10 and is shown as being mounted for use on the machine or other piece of work W to be tested, and as being connected with an amplifier A and a recorder R for measuring electrical signals which are obtained as representative of the vibrations of the apparatus being tested.

The accelerometer disclosed includes a housing in the form of a case 12 which has a rigid and relatively massive base 14 provided with an upstanding integral cylindrical housing wall 15. The base 14 is centrally bored and threaded at 16 to receive an upstanding stud 17 of an insulating mounting member 18 provided with a depending mounting stud 20 threaded at 22 into a bore in the workpiece W to be tested.

Mounted upon the upper face of the base 14 is a piezoelectric element or unit 24, upon which rests an inertial or mass member 25 that transversely fills the cylindrical wall member 15 except for a small annular working clearance. The upper portion of the inertial member 25 is countersunk to provide an internal cylindrical wall 26 and a narrow annular mounting shoulder 28 upon which rests a flat-ground precision spring 30 constituting one of the important features of this improvement. Below the level of the annular shoulder 28, the inertial member 25 is counterbored at 32 to provide a shallow cylindrical cavity which will accomodate flexure or deformation of the precision spring 30. The diameter of the flat precision spring 30 is such as to largely fill the countersunk wall portion 26 with sufficient working clearance, approximately as illustrated.

The upper end of the cylindrical housing wall 15 is provided with a threaded closure plug or ring 35 which is received in internal threads 36 in the part 15. In practice, a small pin or set screw 38 or similar lateral anchor means is employed to retain the plug 35 in a fixed position.

For the purpose of preloading the flat precision spring 30, a loading stud 40 is mounted centrally and concentrically, or nearly so, in the plug 35 by means of threads 42. The inner or lower end of the preloading stud 40 is rounded at 43, preferably in the form of a segment of a sphere, to bear upon the flat spring 30 at or near its center, substantially as illustrated. Any appropriate tool socket for setting the stud 40 may be provided in the top thereof as indicated by dotted lines at 44, so that the rounded end 43 of the loading stud 40 may be rotated and caused to press concentrically upon the top face of the flat spring 30 with the required force.

In the form illustrated, the piezoelectric element or unit 24 is formed of a stack of piezoelectric crystals in disc or wafer form, as indicated at 45. The lowermost crystal 45 is received in a countersunk recess 46 in the top wall of the rigid base 14. The crystals are of cylindrical configuration, and the end faces are parallel. The upper face of the uppermost crystal 45 is received in an opposing countersunk recess 48 in the bottom of the inertial member 25. The diameters of the respective crystal elements 45 are slightly less than those of the recesses 46 and 48 with such minor working clearance as may be required. The crystal unit 24, the inertial member, the spring and the stud are all aligned symmetrically along the main sensitivity, or acceleration, axis of the accelerometer.

Between alternate piezoelectric crystal discs 45, there are disposed electrode elements 50 formed from appropriate metal sheets such as silver-plated brass. Two alternate electrodes 50 are peripherally provided with projecting electrode tabs or terminals 51 which are in turn parallel connected in any suitable manner to a flexible lead 52. Such lead 52 passes through an insulating plug 54 to a coaxial cable-connector 55 threaded at one end into the base 14 and threaded at its outer end to receive a fitting of a coaxial cable. An intervening electrode 56, also disc-shaped, is shown as being disposed between the piezoelectric crystal discs 45 which are located between the electrodes 50, such electrode 56 being provided with a tab or terminal 58 grounded to the housing 12 by a flexible lead (not shown). If the stack of piezoelectric crystal discs 45 is increased beyond the number shown, then additional intervening grounded electrodes 56 and additional electrodes 50 are employed. The grounded electrode or electrodes 56 are connected through the base 14 and by way of the threaded connector 55 to the sheath 60 of the mentioned coaxial cable leading to the amplifier A and the recorder R whereby electrical impulses generated in the piezoelectric unit 24 are accordingly amplified and recorded as a measure of the vibratory conditions in the work W being tested.

In employing the construction of this invention, the piezoelectric unit 24 is placed under compression through the medium of the flat preloading precision spring 30 and the threaded preloading stud 40 whose rounded end 43 bears upon the center of the spring 30.

By fitting an appropriate tool to the socket 44 in the outer end of the preloading stud 40, such preloading force as desired may be applied to the flat spring 30 and thence, by way of the inertial mass member 25, to the disc elements 45 of the piezoelectric unit 24. Even in a small accelerometer, having dimensions for example such as above mentioned, preloading forces of as much as 300 pounds may be applied through the flat spring 30 by way of adjustment of the preloading stud 40.

In assembling accelerometers of this invention, the preloading stud 40 is threaded into the closure plug 35 to project from the inner side of the latter by a predetermined amount, such as 10 mils. This assembly of the stud 40 and the closure plug 35 is then turned down into the upstanding casing wall 15 in the threads 36 until the inner end of the stud 40 just contacts the flat precision spring 30. The closure plug 35 is then locked in place by the set screw 38. The preloading plug 40 is now torqued through a predetermined angle, for example 90°, to strain the spring 30 by an accurately predetermined amount, thus stressing it to a predetermined amount and thus applying the 300-pound force above indicated.

By virtue of the fact that the various parts of a number of accelerometers so manufactured have substantially identical characteristics, the effective spring constant or compliance, and hence the effective resonant frequencies and sensitivities of the accelerometers, are very nearly the same. Accelerometers so produced are found to have low cross-axis sensitivity. This result appears to be due to the fact that the force applied by the preloading stud 40 to the spring 30, and hence the force applied by the spring to the stack of crystals, is along the main sensitivity axis of the accelerometer, that is, the axis perpendicular to the faces of the crystals and the base. By virtue of the fact that the applied force is substantially confined to this direction, the crystals are not sheared as the stud is rotated, with the result that cross-axis sensitivity is not introduced because of such rotation. In this connection, it is to be noted that the formation of such shearing forces is avoided by virtue of the fact that the pressure point of the preloading stud is axially centered on the stud so that when the stud is rotated, its point of contact with the spring remains fixed and it advances along a line parallel to the main axis of the accelerometer. This is true even though the preloading stud 40 is not concentric with the threaded ring 35. On the other hand, if the plug is not centered in the ring 35 and pressure is applied by rotating the ring 35, the point of contact of the preloading stud with the spring would move along the arc of a circle having a radius corresponding to the eccentricity of the nose relative to the outer wall 15 of the case.

The introduction of shearing forces, and hence the creation of cross-axis sensitivity, is also greatly minimized by employing a preloading precision spring which is flat or nearly so, and also by virtue of the fact that the preloading stud is closely, though not necessarily accurately, centered relative to the spring and relative to the recess in the inertial member. Though the spring need not be perfectly flat or planar, it is best manufactured in the form of a smooth, accurately-ground disc. The spring should have a radius of curvature normal to its main surface that is very large compared with the radius of curvature of the nose of the preloading stud. As a matter of fact, even when the spring is perfectly flat prior to application of the force of the preloading stud, the spring is strained to a curved shape.

It is to be noted that if the characteristics of the spring are such that when the stud is rotated through a predetermined angle the spring material exceeds its elastic limit, under such conditions, the spring becomes preloaded to a predetermined amount even though it is permanently deformed.

As has been previously indicated, the spring 30 is flat-ground to precise dimensions which have been predetermined. Also, the various parts and the locating recesses are sized to small clearances whereby further to reduce eccentricity and shift of parts during assembly and preloading.

The crystal discs 45 employed to build up the piezoelectric element 24 may be produced as preferred. They may, for example, be in the form of alternately polarized flat circular piezoelectric crystal discs, each of which may have been finished smooth to an optical polish, and the metal faces of the base 14 and the under side of the inertial mass member 25 will similarly have been finished smooth, as by lapping. The discs may be produced of commercially available ceramic piezoelectric crystal material on the market for these purposes. Such materials include barium titanate, lead metaniobate, cadmium niobate, sodium niobate, a mixture of lead titanate and lead zirconate, lead stabilized barium titanate, and many others of which the above are exemplary. In an accelerometer of the type employing a stack of such piezoelectric crystal discs, for best results, the discs are alternately polarized. Furthermore, where several discs are employed, they are stacked in a random manner to obtain low cross-axis sensitivity at low cost. In addition, in accordance with this invention, the compression force is applied without introduction of shearing forces. In this way, introduction of excessive cross-axis sensitivity that would otherwise be caused by such shearing forces is avoided.

Although only one particular form of the invention has been specifically disclosed and described herein, it will be obvious that the invention is not limited to that particular form, but is capable of being embodied in other forms. Various changes, which will suggest themselves to those skilled in this art, after learning of the present invention, may be made in the material, form, details of construction and arrangement of the parts without departing from the scope of the invention as defined by the patent claims.

The invention claimed is:

1. An accelerometer including a housing having a rigid base member adapted to be mounted upon an object under test;

an inertial member supported in said housing;

a piezoelectric unit disposed between said base member and said inertial member and having its electric axis aligned with the axis of said housing;

a disc-shaped spring member mounted in a seat in said inertial member on the opposite side thereof from said piezoelectric unit and over a spacing cavity in said inertial member;

and a stressing member rigidly mounted in the upper wall of said housing on the opposite side of said spring member from said inertial member, said stressing member having a nose centrally engaging said spring member, said stressing member including means for adjustably moving said nose along a fixed axis parallel to the axis of said housing, whereby said piezoelectric unit is subjected to stress along said axis.

2. An accelerometer as in claim 1, wherein said seat is formed by a countersunk counterbored shoulder receiving said spring member over the underlying counterbored cavity.

3. An accelerometer as in claim 2, wherein said stressing member is a stud threaded into said closure, the inner end of said stud having an axially positioned bearing point engaging said spring member.

4. An accelerometer including a housing having a rigid base member adapted to be mounted upon an object under test;
an inertial member supported in said housing;
a piezoelectric unit disposed between said base member and said inertial member and having its electric axis aligned with the axis of said housing;
a disc-shaped spring member mounted in a seat in said inertial member on the opposite side thereof from said piezoelectric unit and over a spacing cavity in said inertial member;
and a stressing member threadably mounted in the upper wall of said housing on the opposite side of said spring member from said inertial member, said stressing member having a nose axially centered thereon and centrally engaging said spring member, for adjustably stressing said spring member, whereby said piezoelectric unit is subjected to stress along said axis.

5. An accelerometer including a housing having a rigid base member adapted to be mounted upon an object under test;
an inertial member supported in said housing;
a piezoelectric unit disposed between said base member and said inertial member and having its electric axis aligned with the axis of said housing;
means including a resilient member bearing annularly on said inertial member over a cavity therein and compressing said piezoelectric unit between said inertial member and said base member; and a stressing member threadedly mounted in the outer portion of said housing opposite said base member and having a nose bearing against the center of said resilient member to stress said unit without shearing said unit in a direction normal to said axis.

6. An accelerometer including a housing formed about an axis and having a rigid base member adapted to be mounted upon an object under test;
a support member including an inertial member in said housing;
a piezoelectric unit disposed between said base member and said inertial member and having its electric axis aligned with the axis of said housing;
a threaded member threadably engaging in the outer end of said housing opposite said base member;
and resilient disc means bearing on a spaced annular shoulder in said inertial member opposite said threaded member for compressing said piezoelectric unit between said inertial member and said base member, said threaded member engaging said support member at a point on the axis of said threaded member.

References Cited in the file of this patent
UNITED STATES PATENTS

| | | |
|---|---|---|
| 1,613,117 | Miller | Jan. 4, 1927 |
| 1,619,125 | Hough | Mar. 1, 1927 |
| 2,047,387 | Scott | July 14, 1936 |
| 2,167,506 | Haase | July 25, 1939 |
| 2,202,220 | Miller | May 28, 1940 |
| 2,411,401 | Welch | Nov. 19, 1946 |
| 2,453,532 | Norton | Nov. 9, 1948 |
| 2,639,210 | Robertson | May 19, 1953 |
| 2,682,003 | Stubner | June 22, 1954 |
| 2,714,672 | Wright et al. | Aug. 2, 1955 |